United States Patent
Tamura

(10) Patent No.: US 7,110,476 B1
(45) Date of Patent: Sep. 19, 2006

(54) DEMODULATION AND MODULATION CIRCUIT AND DEMODULATION AND MODULATION METHOD

(75) Inventor: Koichi Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/510,861

(22) Filed: Feb. 23, 2000

(30) Foreign Application Priority Data

Feb. 24, 1999 (JP) .................................. 11-045636

(51) Int. Cl.
*H03D 3/18* (2006.01)
(52) U.S. Cl. .................. 375/327; 375/355; 375/371
(58) Field of Classification Search ............... 375/316, 375/324, 325, 326–329, 339, 340, 344, 354, 375/355, 363, 364, 365–366, 367, 368, 327, 375/371; 329/302, 307, 323, 325, 360, 361
See application file for complete search history.

(56) References Cited

U.S. PATENT DOCUMENTS

| | | | |
|---|---|---|---|
| 3,641,274 A * | 2/1972 | Sasaki et al. ............. 370/324 |
| 4,057,762 A * | 11/1977 | Namiki ...................... 375/376 |
| 4,527,278 A | 7/1985 | Deconche et al. .......... 375/344 |
| 4,879,728 A * | 11/1989 | Tarallo ...................... 375/324 |
| 5,144,256 A | 9/1992 | Lim ........................... 329/302 |
| 5,287,388 A * | 2/1994 | Ogura et al. ............... 375/344 |
| 5,343,498 A | 8/1994 | Toy et al. .................. 375/259 |
| 5,414,728 A | 5/1995 | Zehavi ....................... 375/142 |
| 5,550,869 A | 8/1996 | Gurantz et al. ............ 375/340 |
| 5,572,516 A * | 11/1996 | Miya et al. ................ 370/342 |
| 5,596,582 A * | 1/1997 | Sato et al. ................. 370/509 |
| 5,625,652 A * | 4/1997 | Petranovich ............... 375/355 |
| 5,694,388 A * | 12/1997 | Sawahashi et al. ........ 370/206 |
| 5,784,414 A * | 7/1998 | Bruekers et al. .......... 375/324 |
| 5,809,009 A | 9/1998 | Matsuoka et al. ........ 370/206 |
| 5,905,405 A * | 5/1999 | Ishizawa .................... 329/308 |
| 5,920,220 A * | 7/1999 | Takao et al. ............... 327/233 |
| 5,991,344 A * | 11/1999 | Fujii et al. ................. 375/344 |
| 6,151,356 A * | 11/2000 | Spagnoletti et al. ....... 375/226 |
| 6,480,521 B1 * | 11/2002 | Odenwalder et al. ...... 375/130 |
| 6,621,527 B1 * | 9/2003 | Limberg et al. ........... 348/725 |
| 6,631,174 B1 * | 10/2003 | Asahara et al. ............ 375/344 |
| 6,693,978 B1 * | 2/2004 | Horii et al. ................ 375/326 |

FOREIGN PATENT DOCUMENTS

| | | |
|---|---|---|
| CN | 1092231 A | 9/1994 |
| EP | 0 606 163 A2 | 7/1994 |
| EP | 0 716 520 A1 | 6/1996 |
| GB | 2266645 A | 11/1993 |
| GB | 2298341 A | 8/1996 |
| GB | 2319703 A | 5/1998 |
| GB | 2335828 A | 9/1999 |
| JP | 48-30308 | 4/1973 |
| JP | 54-133812 | 10/1979 |

(Continued)

*Primary Examiner*—Kevin Kim
(74) *Attorney, Agent, or Firm*—Scully, Scott, Muphy & Presser, P.C.

(57) ABSTRACT

A demodulation circuit and a demodulation method can optimize sampling timing with achieving reduction of power consumption. A preliminarily known signal is inserted in the digital transmission signal upon transmission. The demodulation circuit includes A/D converting means for performing A/D conversion of a base band signal obtained by demodulation of the digital transmission signal, and phase shifting means for causing phase shift of one of the digital transmission signal and the base band signal on the basis of the known signal after digital conversion by the A/D converting means and the known signal upon transmission.

6 Claims, 12 Drawing Sheets

FOREIGN PATENT DOCUMENTS

| | | |
|---|---|---|
| JP | 64-5135 | 1/1989 |
| JP | 4-72932 | 3/1992 |
| JP | 5-244144 | 9/1993 |
| JP | 6-252963 | 9/1994 |
| JP | 7-50623 | 2/1995 |
| JP | 7-99486 | 4/1995 |
| JP | 7-250120 | 9/1995 |
| JP | 7-297870 | 11/1995 |
| JP | 07297870 A * | 11/1995 |
| JP | 8-88622 | 4/1996 |
| JP | 8-111677 | 4/1996 |
| JP | 8-139775 | 5/1996 |
| JP | 8-223132 | 8/1996 |
| JP | 8-242260 | 9/1996 |
| JP | 2570126 | 10/1996 |
| JP | 8-307474 | 11/1996 |
| JP | 10-260653 | 9/1998 |
| JP | 10-341263 | 12/1998 |
| JP | WO98/56148 * | 12/1998 |
| JP | 11-103326 | 4/1999 |
| WO | WO 96/16492 A1 | 5/1996 |
| WO | WO 00/11814 A1 | 3/2000 |

* cited by examiner

FIG.6

| SAMPLING TIMING PHASE DIFFERENCE | $\theta_1$ | $\theta_2$ | $\theta_3$ | - - - | $\theta_{N-2}$ | $\theta_{N-1}$ | $\theta_N$ |
|---|---|---|---|---|---|---|---|
| CORRELATION VALUE | $r_1$ | $r_2$ | $r_3$ | - - - | $r_{N-2}$ | $r_{N-1}$ | $r_N$ |

DEMODULATION AND MODULATION CIRCUIT AND DEMODULATION AND MODULATION METHOD

BACKGROUND OF THE INVENTION

1. Field of the Invention

The present invention relates generally to a demodulation and modulation circuit and demodulation and modulation method. More particularly, the invention relates to a demodulation and modulation circuit and demodulation and modulation method of a digital transmission signal to be used in a cellular phone terminal.

2. Description of the Related Art

Conventionally, sampling in an analog-to-digital (A/D) converter in a demodulation circuit causes phase shift due to a frequency offset between transmission and reception and thus cannot be performed constantly at optimal sampling timing.

Therefore, at certain sampling timing, it is possible to significantly degrade reception characteristics for occurrence of error in symbol judgment due to sampling of the reception signal close to zero crossing (boundary point in transition where symbol is changed from positive to negative or negative to positive).

The following equation shows adverse influence of the frequency offset for demodulation. It is assumed that a modulated wave is expressed by:

$$s(t) = A(t) \cos[2\pi f c t + \phi(t)]$$

Here, A(t) is assumed to be +1 or −1, and a carrier wave component $\cos[2\pi fct]$ of the modulated wave set forth above is a reference signal pi(t), an orthogonal demodulator output I component is expressed by:

$$\begin{aligned} I(t) &= s(t) \times pi(t) \\ &= A(t)\cos[2\pi fct + \phi(t)] \times \cos[2\pi fct] \\ &= (A(t)/2) \times [\cos(4\pi fct + \phi(t)) + \cos\phi(t)] \end{aligned}$$

By cutting off $\cos(4\pi fct+\phi(t))$ as the second term on right side by LPF, the I component can be expressed by:

$$I(t) = (A(t)/2) \times \cos \phi(t)$$

to obtain phase information of I component of a PSK modulated wave.

Similarly, a carrier wave component $-\sin[2\pi fct]$ which is obtained by shifting the phase for $\pi/2$ ahead of the modulated wave is a reference signal pq(t), an orthogonal demodulator output Q component is expressed by:

$$Q(t) = A(t) \cos[2\pi fct+\phi(t)] \times (-\sin[2\pi fct]) = A(t)/2) \times \cos \phi(t)$$

However, since the frequency offset $\Delta\theta(t)$ is caused between transmission and reception in the practical circuit, respective reference signals can be expressed by:

$$pi(t) = \cos[2\pi fct + \Delta\theta(t)]$$

$$pq(t) = -\sin[2\pi fct + \Delta\theta(t)]$$

The orthogonal demodulation output is expressed by multiplying the foregoing reference signal and the modulated wave and cutting off a high frequency component by the LPF:

$$\begin{aligned} I(t) &= A(t)\cos[2\pi fct + \phi(t)] \times \cos[2\pi fct + \Delta\theta(t)] \\ &= (A(t)/2)\cos(\phi(t) - \Delta\theta(t)) \\ Q(t) &= A(t)\cos[2\pi fct + \phi(t)] \times -\sin[2\pi fct + \Delta\theta(t)] \\ &= (A(t)/2) \times \cos(\phi(t)) - \Delta\phi(t) \end{aligned}$$

Thus, adverse influence of the frequency offset appears on the orthogonal demodulation output. By this, the phase of an input signal of the A/D converter is shifted to cause offset from a desired sampling timing.

Examples of the prior art of this kind have been disclosed in (1) Japanese Unexamined Patent Publication No. Heisei 8-223132, (2) Japanese Unexamined Patent Publication No. Heisei 10-260653 and (3) Japanese Patent No. 2570126 (hereinafter referred to as prior art 1 to 3.

The prior art 1 is designed to insert a pilot signal to the transmission signal, derive a frequency offset $\Delta k$ and a synchronization offset $\delta$ of the sampling timing on the basis of the transmission frequency k of the pilot signal and the reception frequency k', and control the sampling period and a transmission frequency of a frequency converter so as to reduce the foregoing offsets to zero.

The prior art 2 is designed for controlling a delay amount of the sampling clock and for controlling the phase of the sampling clock of the input video signal S1 to the phase adapted for the input video signal S1.

The prior art 3 is designed for extracting a clock signal component from a demodulation base band signal and outputting a signal synchronized with the clock signal component as a sampling clock.

As set forth above, in the foregoing prior arts 1 to 3, the ploblem that the phase of the input signal of the A/D converter is shifted to cause offset from the desired sampling timing is solved by controlling the sampling frequency.

However, when the sampling frequency in the A/D converter is increased in order to reduce error in symbol judgment, increasing of power consumption is caused in proportion to increasing of the frequency.

Increasing of power consumption causes significant problem in the equipment desired to be compact and to be used for a long period, such as a communication terminal, e.g. current cellular phone terminal.

SUMMARY OF THE INVENTION

Therefore, it is an object of the present invention to provide a demodulation circuit and a demodulation method which can optimize sampling timing with achieving reduction of power consumption.

According to the first aspect of the present invention, a demodulation circuit for demodulating a digital transmission signal, wherein a preliminarily known signal is inserted in the digital transmission signal upon transmission, the demodulation circuit comprises:

A/D converting means for performing A/D conversion of a base band signal obtained by demodulation of the digital transmission signal; and phase shifting means for causing phase shift of one of the digital transmission signal and the base band signal on the basis of the known signal after digital conversion by the A/D converting means and the known signal upon transmission.

According to the second aspect of the present invention, a modulation circuit for modulating a digital signal comprises:

known signal inserting means for inserting a preliminarily known signal to the digital signal; and modulating means for modulating the digital signal after insertion of the known signal.

According to the third aspect of the present invention, a demodulation method for demodulating a digital transmission signal, wherein a preliminarily known signal is inserted in the digital transmission signal upon transmission, the demodulation method comprising:

first step of performing A/D conversion of a base band signal obtained by demodulation of the digital transmission signal; and second step causing phase shift of one of the digital transmission signal and the base band signal on the basis of the known signal after digital conversion in the first step and the known signal upon transmission.

According to the fourth aspect of the present invention, a modulation circuit for modulating a digital signal comprising:

fifth step of inserting a preliminarily known signal to the digital signal; and sixth step of modulating the digital signal after insertion of the known signal.

BREIF DESCRIPTION OF THE DRAWINGS

The present invention will be understood more fully from the detailed description given hereinafter with reference to the accompanying drawings of the preferred embodiment of the present invention, which, however, should not be taken to be limitative to the present invention, but are for explanation and understanding only.

In the drawings:

FIG. 6 is an illustration showing a relationship between a phase amount to be output from a phase shift control portion 14 and a correlation amount;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

It should be noted that a digital transmission signal in the present invention is a signal which is orthogonally modulated.

Figure 1:
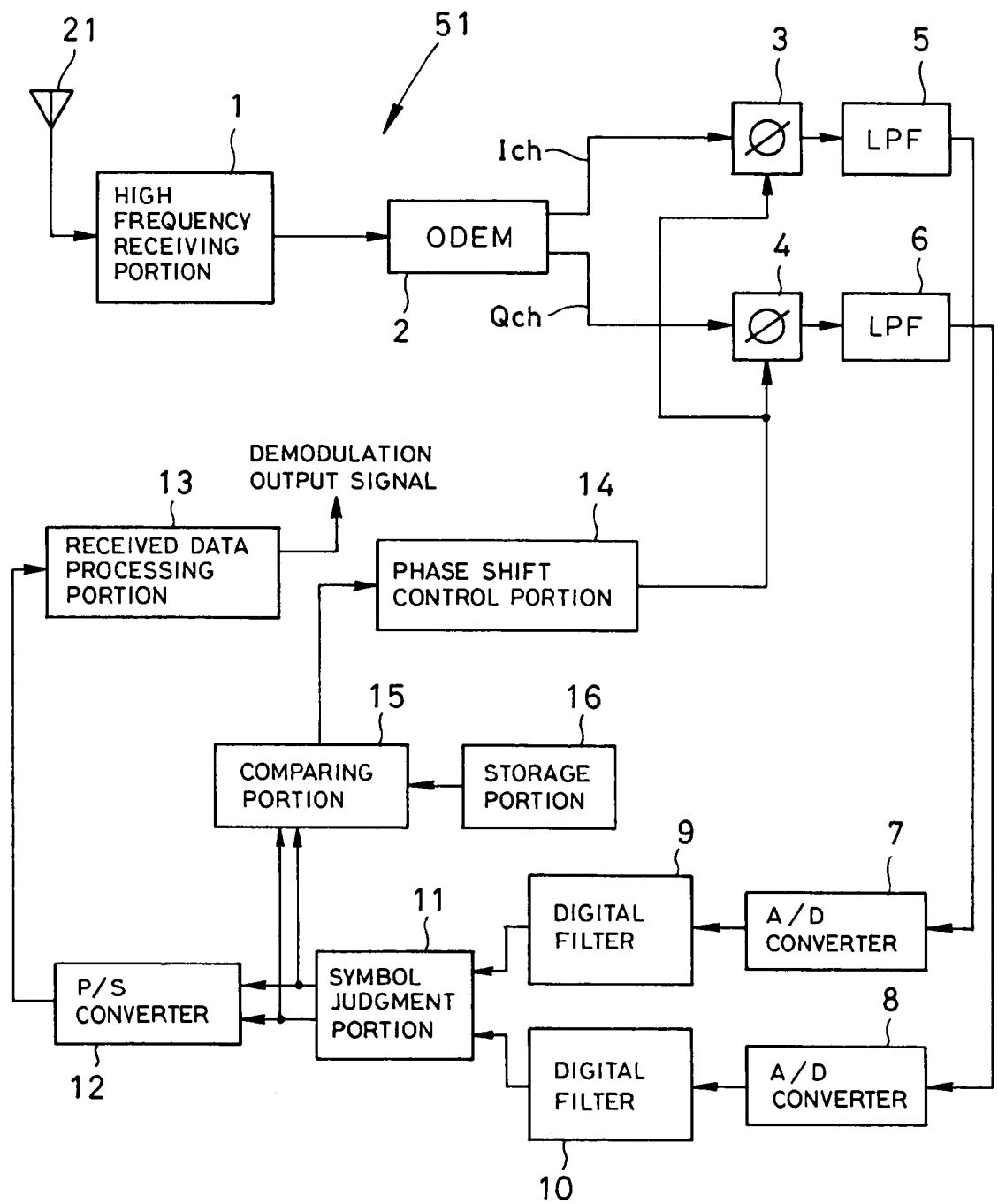
FIG. 1 is a block diagram showing a construction of the first embodiment of a demodulation circuit according to the present invention.

At first, the first embodiment of a demodulation circuit according to the present invention will be discussed. FIG. 1 is a block diagram of the first embodiment of the demodulation circuit 51.

Referring to FIG. 1, the demodulation circuit 51 includes an antenna 21, a high frequency receiving portion 1 receiving a signal from the antenna 21, an orthogonal demodulator (ODEM) 2, phase shifters 3 and 4 for phase shifting a signal from the orthogonal demodulator 2, low pass filters (LPF) 5 and 6 for passing lower band of the signals from the phase shifters 3 and 4, A/D converters 7 and 8 performing A/D conversion of signals from the low pass filters 5 and 6, digital filters 9 and 10 passing predetermined frequencies of the signals from the A/D converters 7 and 8, a symbol judgment portion 11 performing symbol judgment of the signals from the digital filters 9 and 10, parallel/serial (P/S) converter 12 for converting a parallel signal from the symbol judgment portion 11 to a serial signal, a reception data processing portion 13 for performing reception data processing of the signal from the parallel/serial (P/S) converter 12, a phase shift control portion 14 for performing phase shift control of the signal from the reception data processing portion 13, a storage portion 16 preliminarily storing a known signal upon transmission, and a comparing portion 15 extracting a known signal from the parallel signal from the symbol judgment portion 11 and comparing the extracted known signal with the known signal upon transmission stored in the storage portion 16.

While detail will be discussed later, the known signal is inserted in a transmission data in the present invention. A result of comparison of a result of symbol judgment of the known signal by the symbol judgment portion 11 and the known signal for transmission is input to the phase signal control portion 14 for shifting phases of the signals to be input to the A/D converters 7 and 8 on the basis of result of comparison.

Figure 8:
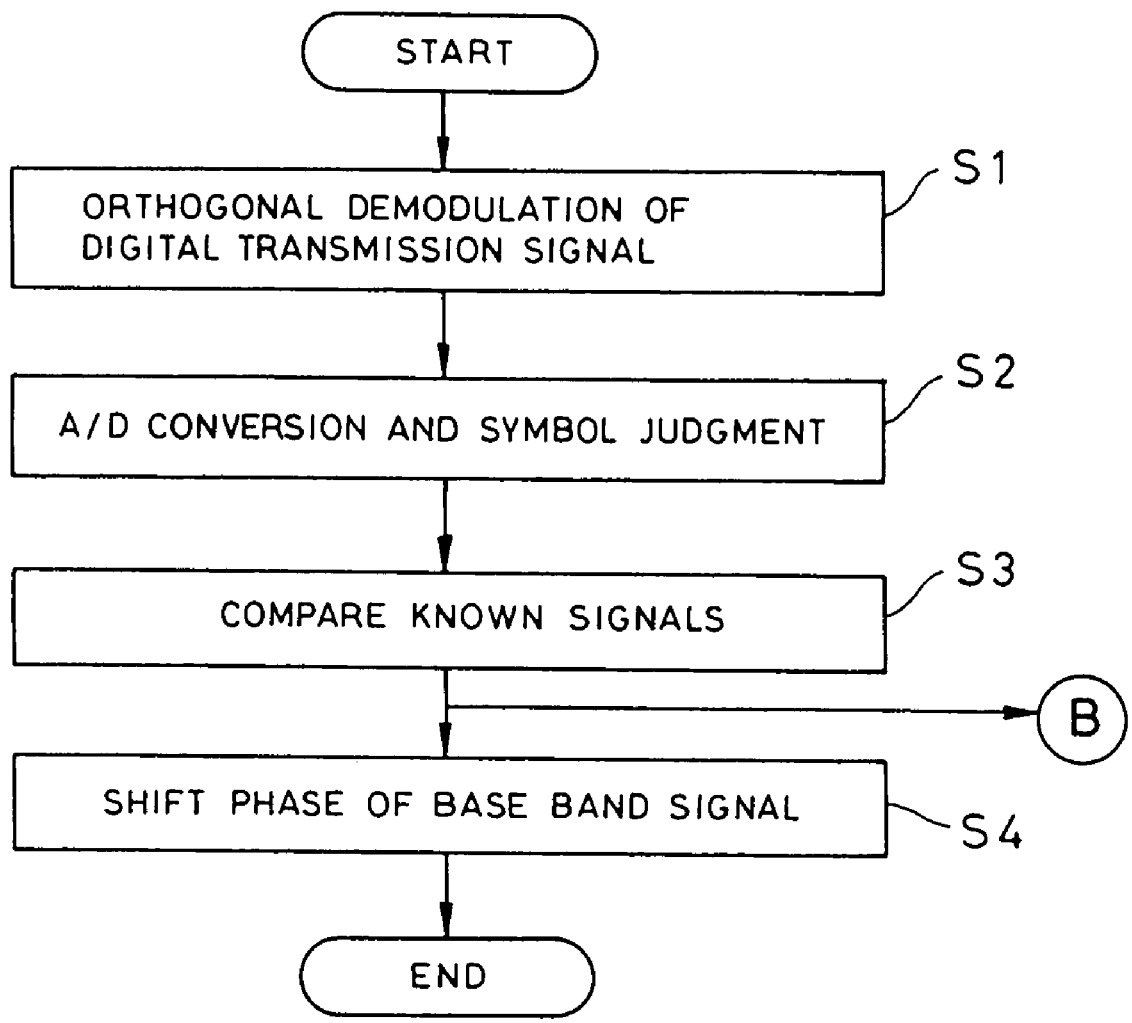
FIG. 8 is a flowchart showing operation of the first embodiment of the demodulation circuit.

Next, operation of the demodulation circuit 51 constructed as set forth above, will be discussed with reference to FIG. 8. A received wave is input to the orthogonal demodulator 2 via the antenna 21 and the high frequency receiving portion 1. A base band signal of the received wave is extracted in the orthogonal demodulator 2 (SI). Next, I component and Q component as output of the orthogonal demodulator 2 respectively pass phase shifters 3 and 4 and unnecessary components are removed from the I component and the Q component by the low pass filters 5 and 6. The I component and Q component removed unnecessary components are subject to A/D conversion by the A/D converters 7 and 8. A/D converted outputs are wave-shaped by the digital filters 9 and 10 in order to avoid intersymbol interference, and then input to the symbol judgment portion 11 (S2). A symbol judgment output is converted into a serial data by the P/S (parallel/serial) converter 12. Then, a desired demodulated output signal is taken out from the received data processing portion 13.

On the other hand, the comparator 15 takes out the known signal from the output of the symbol judgment portion 11. The known signal compares the known signal stored in the storage portion 16 (S3). The phase shift control portion 14 causes the phase shifters 3 and 4 phase shifting on the basis of the result of comparison by the comparing portion 15 (S4).

Figure 3:
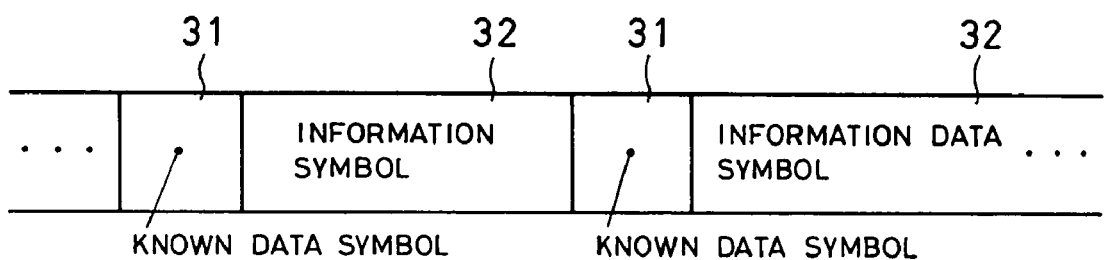
FIG. 3 is an explanatory illustration showing an insertion method of a known signal to be inserted in a transmission data.
Figure 4:
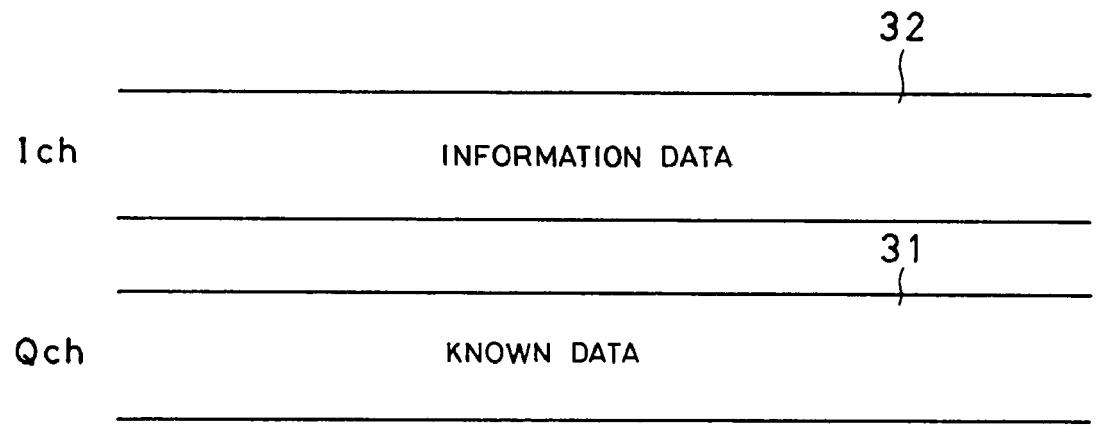
FIG. 4 is an explanatory illustration showing an insertion method of a known signal to be inserted in a transmission data.

Next, insertion method the known signal inserted in the transmission data will be discussed. FIGS. 3 and 4 are diagrammatic explanatory illustration showing the insertion method of the known signal inserted in the transmission data. There are two kinds of methods for inserting the known signal in the transmission data. FIG. 3 shows the first method and FIG. 4 shows the second method.

At first, first known signal insertion method will be discussed. Referring to FIG. 3, the first known signal insertion method multiplexes a known data symbol 31 and an information data symbol 32 in time. A time multiplexed digital transmission signal is input to the orthogonal demodulator 2.

Next, discussion will be given for the second known signal insertion method. Referring to FIG. 4, the information data symbol 32 is assigned to the I channel, and the known data symbol 31 is assigned to the Q channel. These I channel and Q channel are multiplexed. It is also possible to assign the information data symbol 32 to the Q channel and the known data symbol 31 to the I channel.

Figure 5:
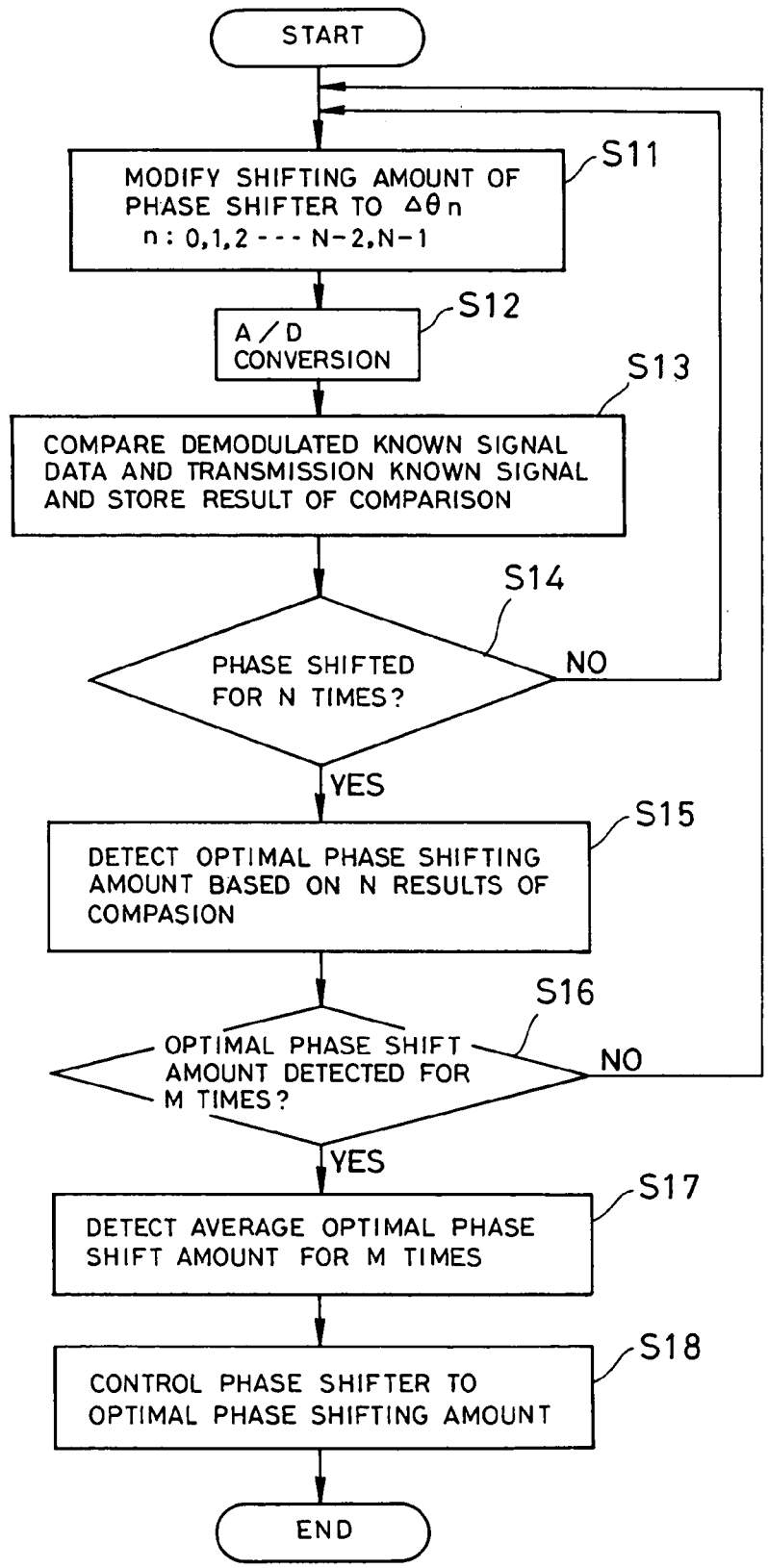
FIG. 5 is a flowchart showing a comparison method in a comparator 15.

Next, comparing method in the comparing portion 15 will be discussed. FIG. 5 is a flowchart showing a comparison method in the comparing portion 15. Referring to FIG. 5, the comparison result is output from the comparator 15. Then, the phase shift control portion 14 outputs phase shifting amount to the phase shifters 3 and 4 on the basis of results of comparison (S11). The phase shifters 3 and 4 cause phase shift of the base band signal in the extent corresponding to the phase shifting amount. After phase shifting, the base band signal is input to the A/D converters 7 and 8 via the low pass filters 5 and 6 for A/D conversion (S12).

The signals after A/D conversion are input to the symbol judgment portion 11 via the digital filters 9 and 10 for symbol judgment. The comparing portion 15 takes out the known signal from the symbol judgment portion 11 to compare with the taken out known signal with a known signal upon transmission stored in the storage portion 16 (S13). The result of comparison is stored in a not shown storage portion in the phase shift control portion 14.

The comparing portion 15 is checked whether comparison is repeated for N (N is integer greater than or equal to two) times (S14). If number of times of comparison is less than N times, the processes at steps S11 to S13 are repeated. Once, number of times of comparison reaches N times, an optimal phase shifting amount is detected on the basis of the N in number of results of comparison (S15). The optimal phase shifting amount is also stored in the not shown storage portion in the phase shift control portion 14.

Next, check is performed whether detection of the optimal phase shifting amount is performed for M (M is positive integer) times (S16). If M times is not reached, the process steps S11 to S15 are repeated. Once M times is reached, an average of M in number of the optimal phase shifting amounts is detected (S17). Then, the phase shift control portion 14 controls the phase shifters 3 and 4 with the average of the M in number of optimal phase shifting amount (S18).

Next, discussion will be given what is "optimal phase shifting amount". The comparing portion 15 derives a correlated value of a known data string upon transmission and a known data string upon reception as the result of comparison.

Now, as one example of the known data string upon transmission is assumed as "+1+1−1+1−1−1+1+1" (8 bit data string). When this is received on the reception side, if the result of symbol judgment in the symbol judgment portion 11 is "+1+1−1+1−1−1+1+1" the same as the known data string upon transmission, the comparing portion 15 obtains "1" as the correlated value normalized by number of data.

On the other hand, if the result of judgment by the symbol judgment portion 11 is "−1+1−1+1−1−1+1−1" (error in two bits), the correlated value of 4/8=0.5 can be obtained. Namely, the correlated value for the most recent phase shifting amount is 0.5. Namely, the correlated value closer to 1 represents lesser error.

Next, discussion will be given why the correlated value becomes 0.5 at two bit error. If data upon transmission is "+1" and data upon reception is also "+1", product of these also becomes "+1". Similarly, if data upon transmission is "−1" and data upon reception is also "−1", product of these also becomes "+1". Namely, when the product is "+1", judgment can be made that bit error is not caused.

On the other hand, if data upon transmission is "+1" and data upon reception is also "−1", product of these also becomes "−1". Similarly, if data upon transmission is "−1" and data upon reception is also "+1", product of these also becomes "−1". Namely, when the product is "−1", judgment can be made that bit error is caused.

Accordingly, when bit error is caused at two bits, two products of "−1" appear. In this since correct bits are six bits (+6), error bits are two (−2) and overall bit number is eight bits, 6−2=4 is established. 4 is a numerator of the foregoing correlation value, and 8 becomes denominator of the foregoing correlated value. Similar discussion will be applicable for bit errors other than two bits.

A relationship between the phase amount (phase difference of the sampling timing) output from the phase shift control portion 14 and the correlated value is shown FIG. 6. FIG. 6 shows the case where the correlated value for the phase difference θ1 is r1, . . . the correlated value for the phase difference θN is rN.

At step S15, the maximum value of the correlated values r1 to rN can be derived. The phase difference with respect to the maximum amount is taken as the optimal phase shifting amount.

Figure 2:
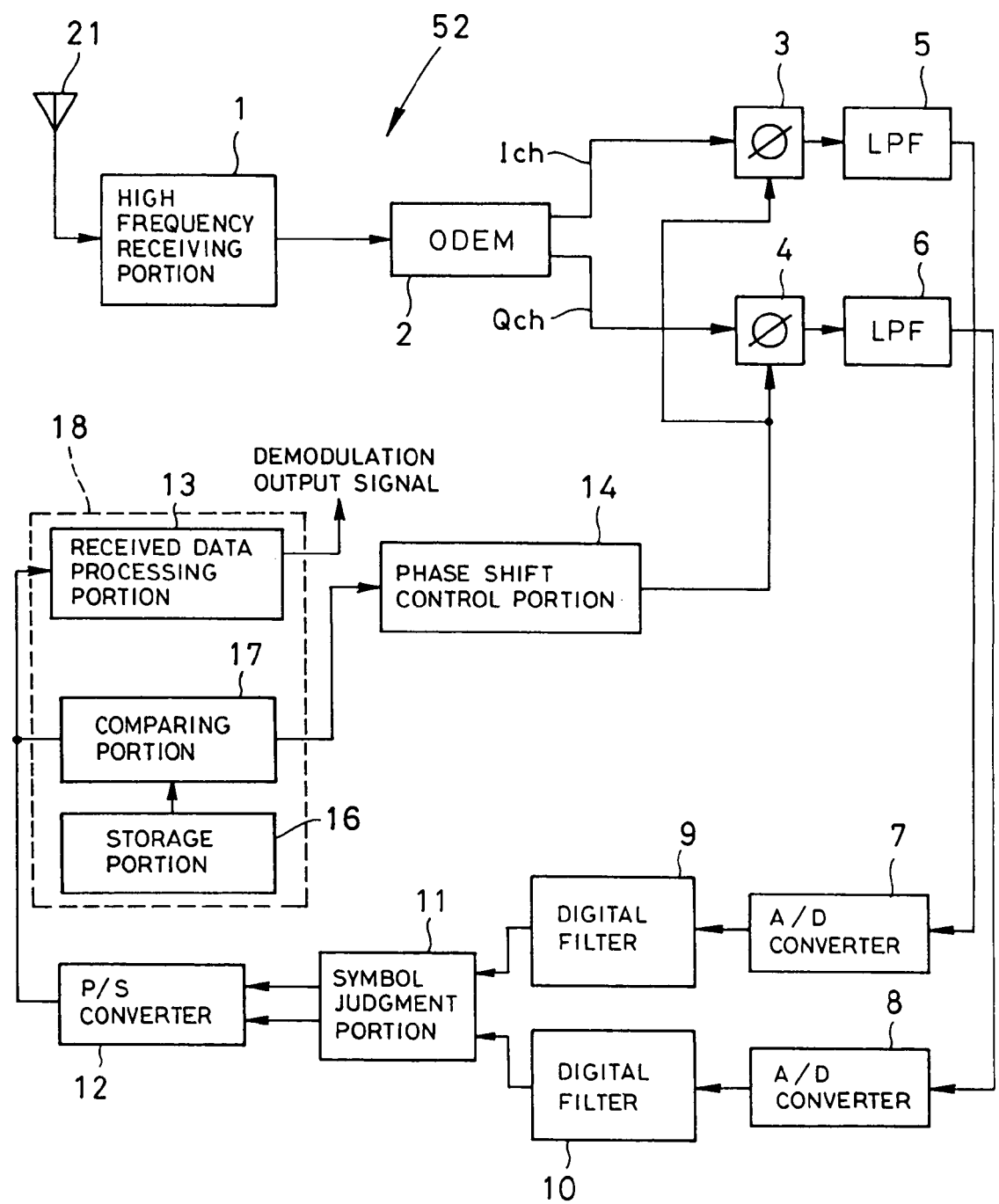
FIG. 2 is a block diagram showing a construction of the second embodiment of a demodulation circuit according to the present invention.

Next, the second embodiment of the demodulation circuit will be discussed. FIG. 2 is a block diagram showing the construction of the second embodiment of the demodulation circuit. The second embodiment is directed to the demodulation circuit 52. It should be noted that like components to those in the first embodiment will be identified by like reference numerals to omit discussion therefor in order to avoid redundant discussion to keep the disclosure simple enough to facilitate clear understanding of the present invention.

Referring to FIG. 2, a point where the second embodiment is differentiated from the first embodiment is that the comparing portion 17 is connected to an output side of the P/S converter 12.

Figure 9:
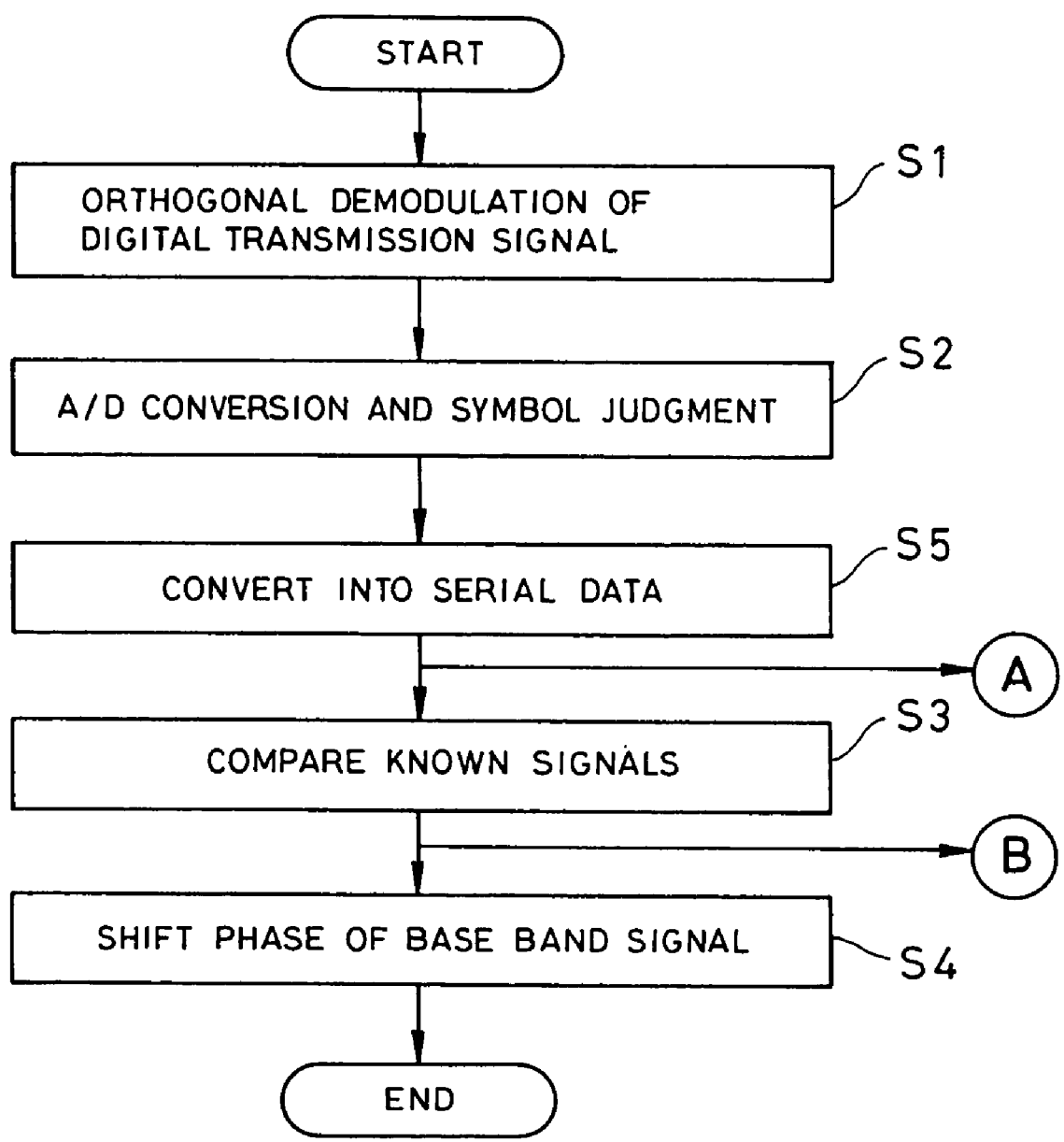
FIG. 9 is a flowchart showing operation of the second embodiment of the demodulation circuit.
Figure 10:
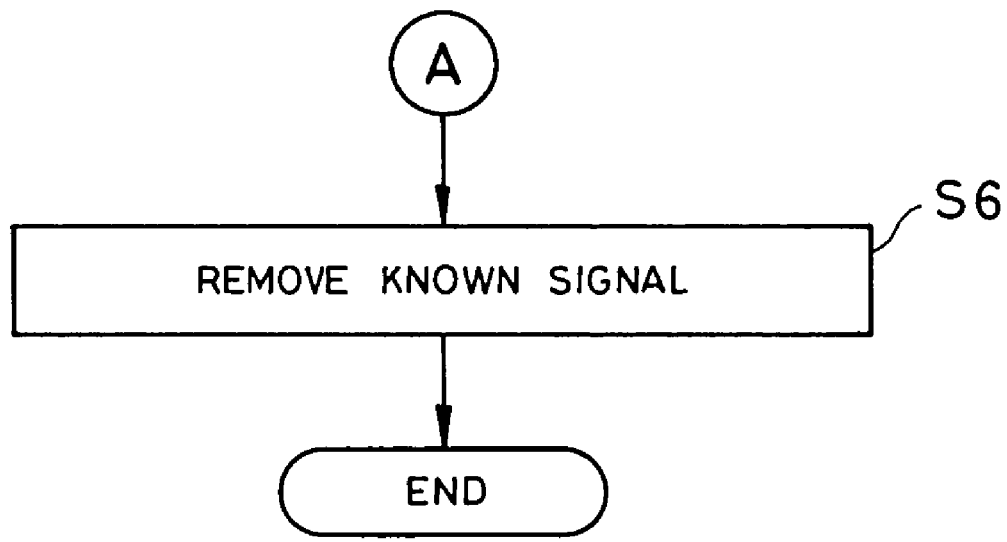
FIG. 10 is a flowchart showing operation of the second embodiment of the demodulation circuit.

FIGS. 9 and 10 are flowcharts showing operation of the second embodiment of the demodulation circuit. Process steps common to the flowchart of the first embodiment will be identified by like step numbers to omit discussion therefor in order to avoid redundant discussion to keep the disclosure simple enough to facilitate clear understanding of the present invention. Next, operation of the demodulation circuit 52 will be discussed with reference to FIGS. 9 and 10.

The A/D conversion output is transmitted to the symbol judgment portion 11 to be judged the symbol. Thereafter, the result of judgment is transmitted to the P/S converter 12 to be converted into the serial data from the parallel data (S5). Next, the comparing portion 17 takes out the known data from data converted into the serial data for comparing with the known data upon transmission stored in the storage portion 16 (S3).

On the other hand, data converted into serial data in parallel to step S3 is transmitted to the reception data processing portion 13. Then, the known signal is removed (S6) for outputting only information data. Other operation is similar to those of the first embodiment.

It should be noted that while the comparing portion 17 and the storage portion 16 are provided separately from the reception data processing portion 13, these components may be integrated as a reception data processing portion 18.

Figure 7:
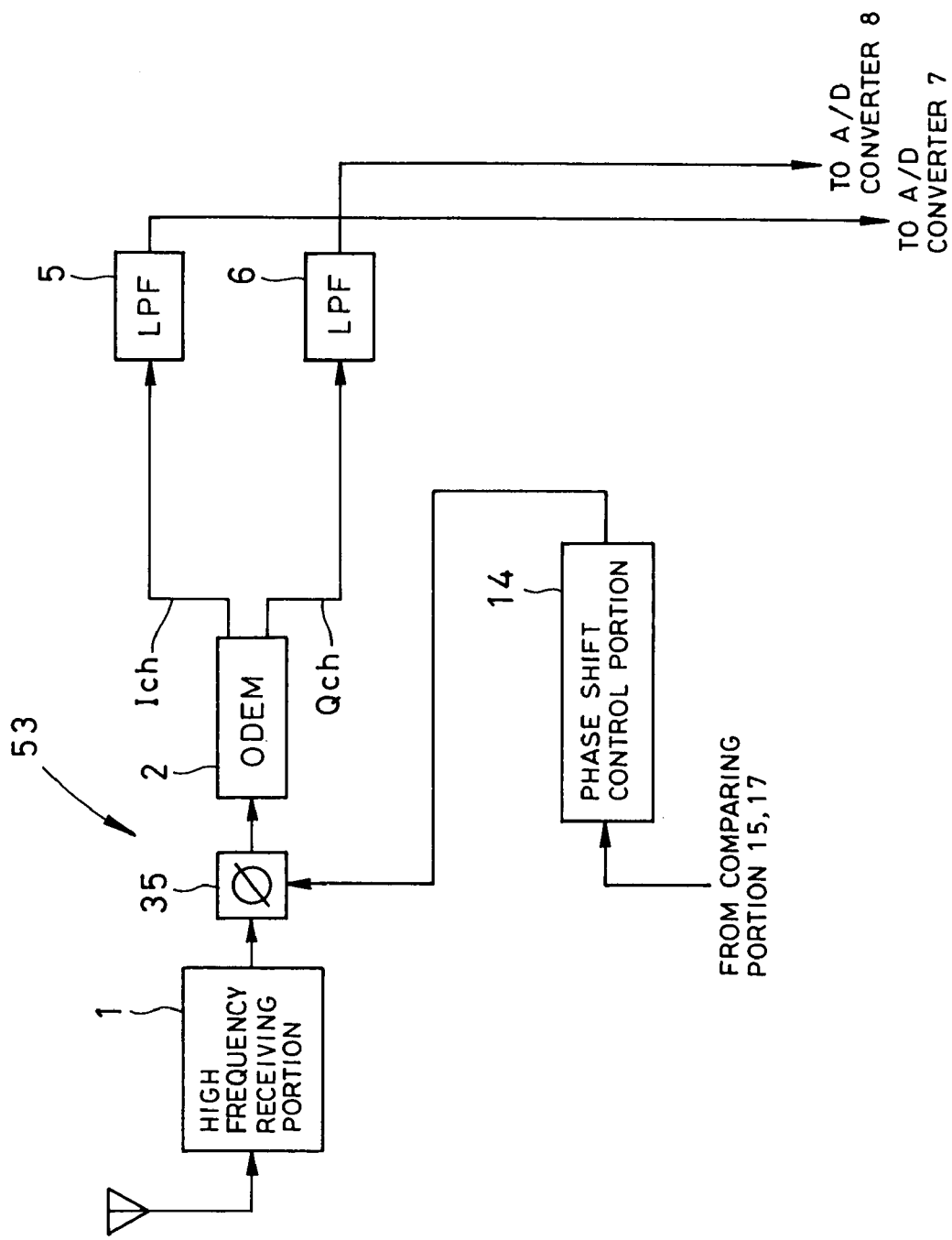
FIG. 7 is a block diagram showing a construction of the third embodiment of a demodulation circuit according to the present invention.

Next, discussion will be given for the third embodiment. FIG. 7 is a block diagram showing the third embodiment of the demodulation circuit according to the present invention. The third embodiment is directed to the demodulation circuit 53. It should be noted that like components to those in the first and second embodiments will be identified by like reference numerals to omit discussion therefor in order to avoid redundant discussion to keep the disclosure simple enough to facilitate clear understanding of the present invention.

Referring to FIG. 7, the point of the third embodiment different from the first and second embodiments is that a phase shifter 35 is connected between the high frequency receiving portion 1 and the orthogonal demodulator 2. With this, the phase shifter 35 becomes sufficient.

Figure 11:
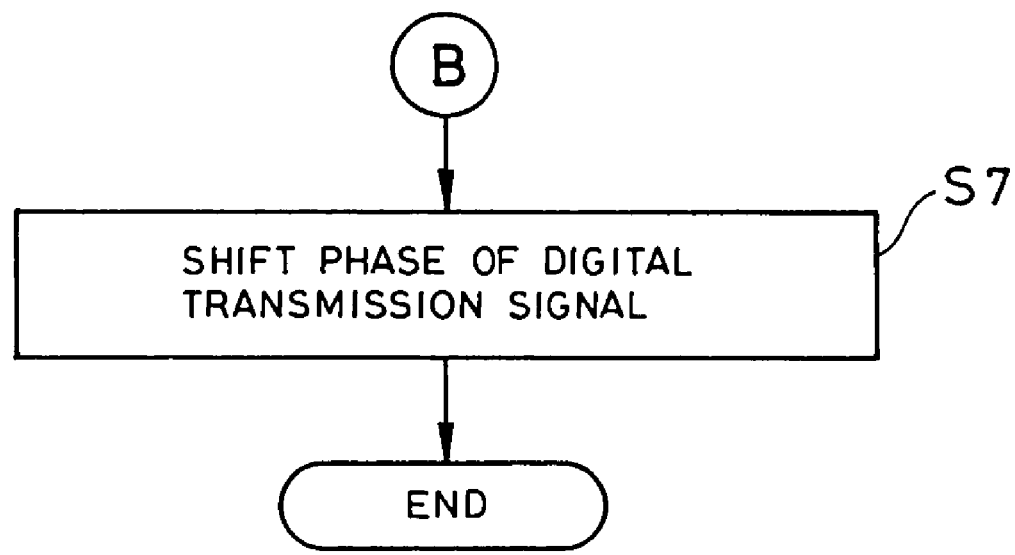
FIG. 11 is a flowchart showing operation of the third embodiment of the demodulation circuit.

FIG. 11 is a flowchart showing the operation of the third embodiment. Next, operation of the third embodiment will be discussed with reference to FIG. 11. At first, discussion will be given for operation with taking the first embodiment as base. Referring to FIG. 11 together with FIG. 8, the known signals are compared by the comparing portion 15 (S3). Thereafter, the phase shift control portion 14 outputs a phase shifting amount to the phase shifter 35 on the basis of the result of comparison to cause the phase shifter 35 to cause phase shifting of the digital transmission signal as output of the high frequency receiving portion 1 (S7).

Next, discussion will be given with taking the operation of the second embodiment as base. Referring to FIG. 11 together with FIG. 9, the known signals are compared by the comparing portion 15 (S3). Thereafter, the phase shift control portion 14 outputs a phase shifting amount to the phase shifter 35 on the basis of the result of comparison to cause the phase shifter 35 to cause phase shifting of the digital transmission signal as output of the high frequency receiving portion 1 (S7).

Figure 12:
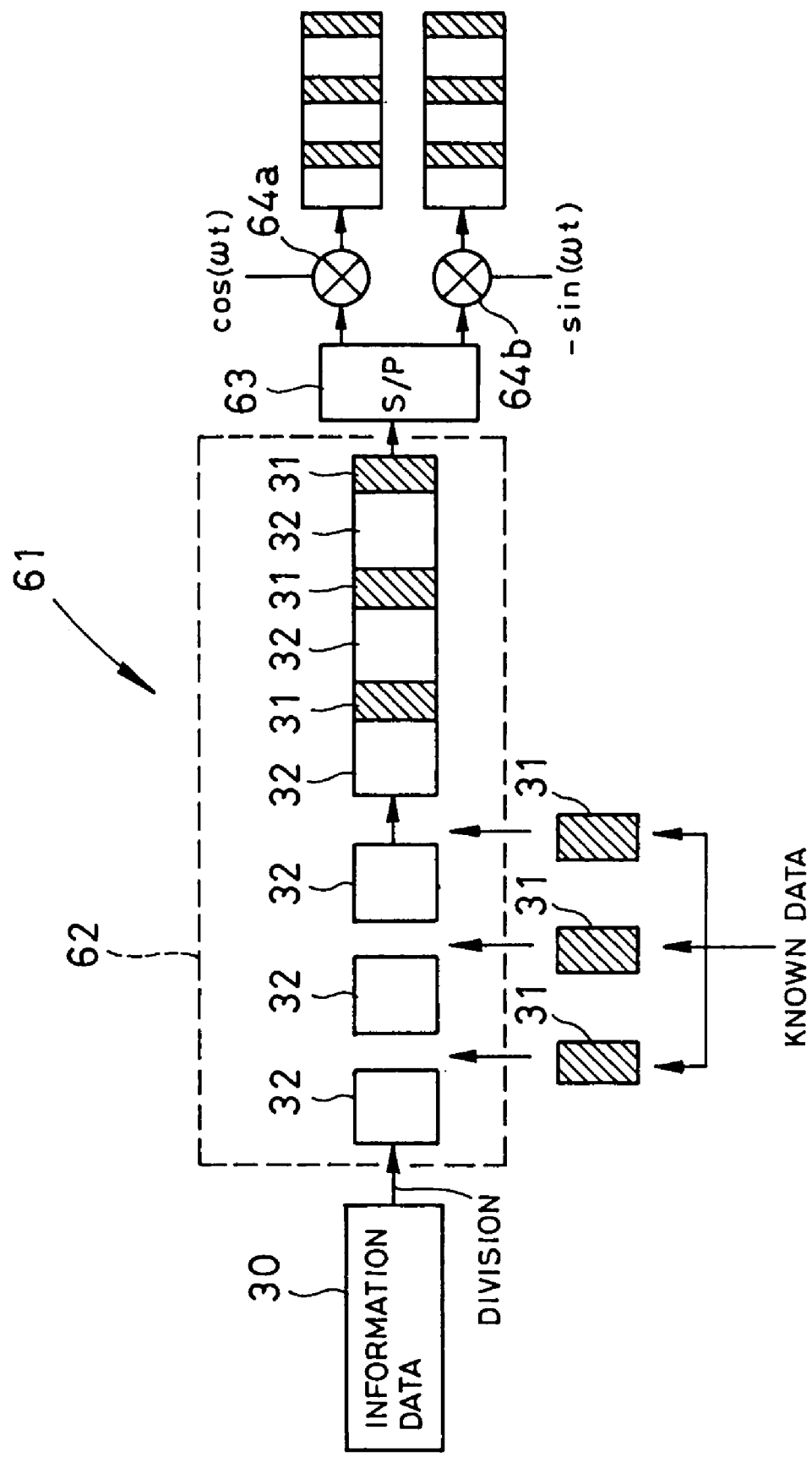
FIG. 12 is a schematic block diagram showing the fourth embodiment of a modulation circuit.

Next, discussion will be given for the fourth embodiment. FIG. 12 is a block diagram of a modulation circuit according to the present invention. The fourth embodiment is directed to the modulation circuit 61. Referring to FIG. 12, the modulation circuit 61 includes a time multiplexing portion 62, a serial/parallel (S/P) converter 63 and an orthogonal modulating portion 64 (64a and 64b).

Figure 14:
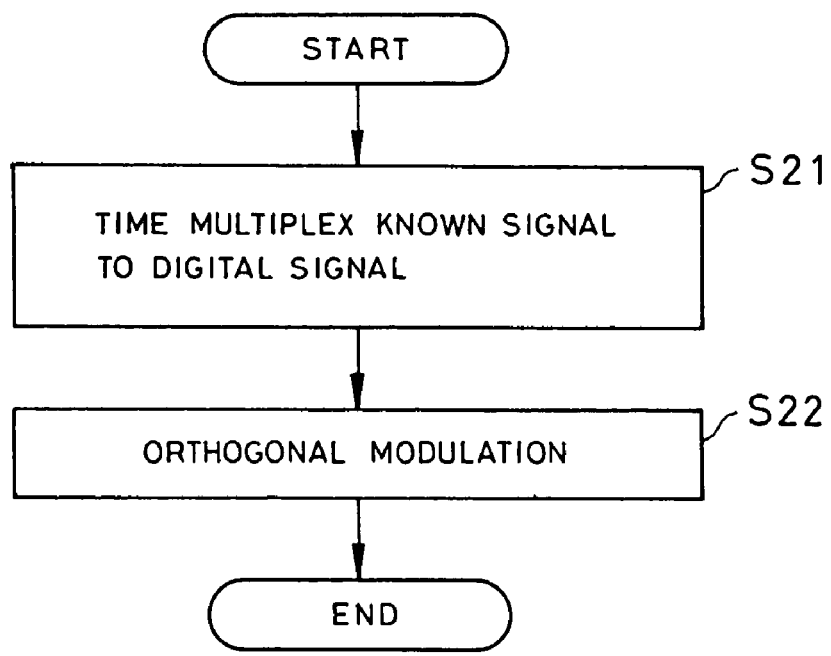
FIG. 14 is a flowchart showing operation of the fourth embodiment of the demodulation circuit.

FIG. 14 is a flowchart showing operation of the fourth embodiment of the present invention, Operation of the modulation circuit 61 will be discussed with reference to FIG. 14. At first, an information data 30 is divided into a plurality of information data 32 by the time multiplexing portion 62 and the information data 32 is time multiplexed with the known data 31 (S21). Namely, information data 32 and the known data 31 are alternately output in time series. Next, the time multiplexed data is converted into the parallel data by the S/P converter 63. Thereafter, respective data are orthogonally modulated by the orthogonal modulating portions 64a and 64b (S22). Then, the digital transmission data orthogonally modulated is received by the demodulators 51 to 53 on reception side.

Figure 13:
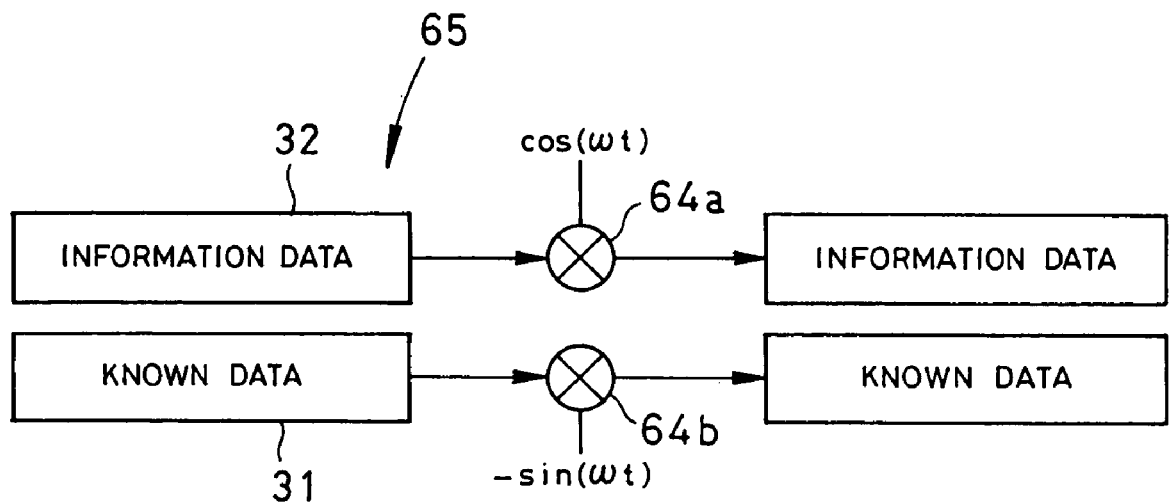
FIG. 13 is a schematic block diagram showing the fifth embodiment of the modulation circuit.

Next, discussion will be given for the fifth embodiment of the modulation circuit. FIG. 13 is a block diagram of the fifth embodiment. The fifth embodiment is directed to a modulation circuit 65. It should be noted that like components to those in the fourth embodiment (FIG. 12) will be identified by like reference numerals to omit discussion therefor in order to avoid redundant discussion to keep the disclosure simple enough to facilitate clear understanding of the present invention.

Referring to FIG. 13, the modulation circuit 65 is constructed with including the orthogonal modulating portion 64a and 64b.

Figure 15:
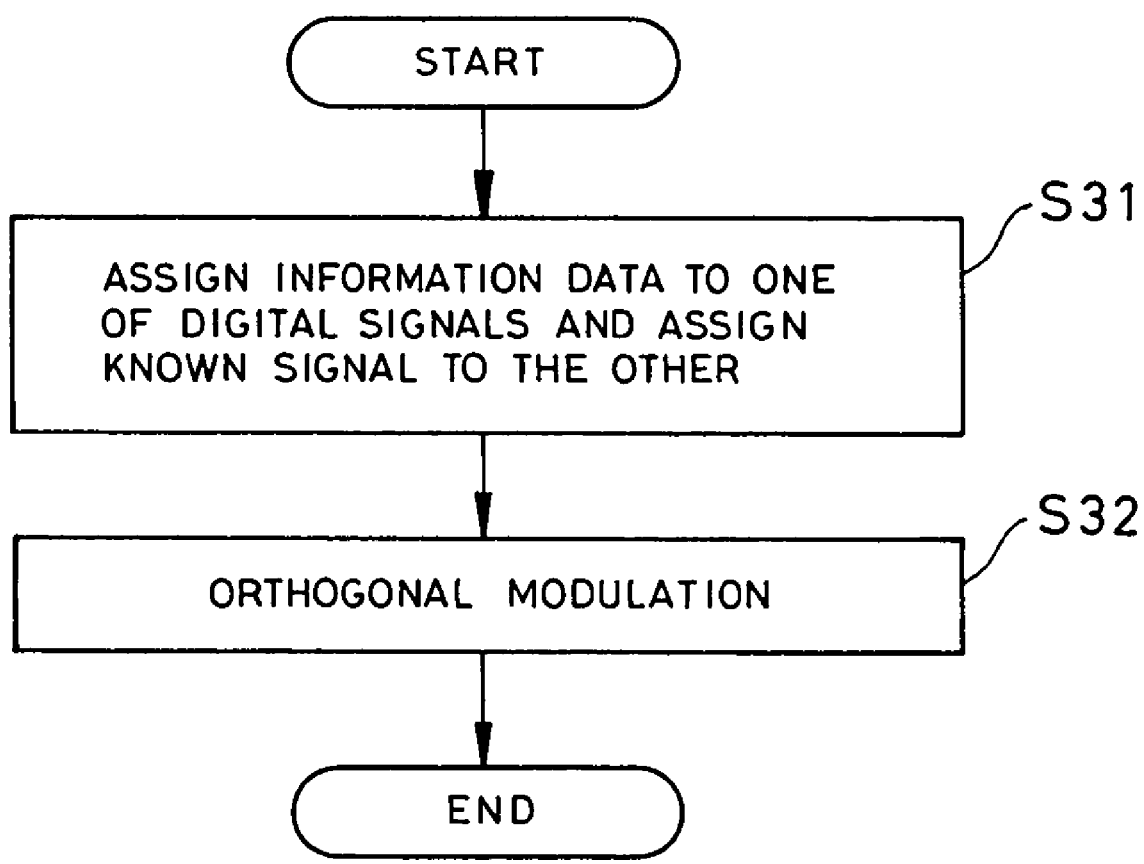
FIG. 15 is a flowchart showing operation of the fifth embodiment of the demodulation circuit.

FIG. 15 is a flowchart showing the operation of the fifth embodiment of the modulation circuit. Operation of the modulation circuit 65 will be discussed with reference to FIG. 15. At first, the information data 32 is assigned to the I channel and the known data 31 is assigned to the Q channel (S31). Next, in the orthogonal modulating portions 64a and 64b, the information data 32 and the known data 31 are orthogonally modulated (S32). Then, the orthogonally modulated digital transmission data is received by the demodulators 51 to 53 on reception side.

With the invention set forth above, in the demodulation circuit for demodulating the digital signal, the preliminarily known signal is inserted to the digital transmission signal upon transmission, and the demodulation circuit includes the A/D converting means for performing A/D conversion of the base band signal obtained by demodulation of the digital transmission signal, and the phase shifting means for causing phase shift of the digital transmission signal or the base band signal on the basis of the known signal after digital conversion by the A/D converting means and the known signal for transmission so as to enable optimization of sampling timing with achieving reduction of power consumption.

Also, with the present invention, the modulation circuit for modulating the digital signal includes the known signal inserting means for inserting the preliminarily known signal to the digital signal and the modulating means for modulating the digital signal after insertion of the known signal. Thus the effect set forth above can be achieved.

Furthermore, with the present invention, in the demodulation method for demodulating the digital signal, the preliminarily known signal is inserted to the digital transmission signal upon transmission, and the demodulation circuit includes a step of performing A/D conversion of the base band signal obtained by demodulation of the digital transmission signal, and a step of causing phase shift of the digital transmission signal or the base band signal on the basis of the known signal after digital conversion in the A/D conversion step and the known signal for transmission so as to enable optimization of sampling timing with achieving reduction of power consumption.

Also, with the present invention, the modulation method for modulating the digital signal includes the a step inserting the preliminarily known signal to the digital signal and a step of modulating the digital signal after insertion of the known signal. Thus the effect set forth above can be achieved.

Namely, according to the present invention, since the sampling timing can be optimized with maintaining the sampling frequency low by shifting the phase of the input signal of the A/D converter, the power consumption which can be increased according to increasing of the sampling frequency, can be lowered.

Furthermore, error in symbol judgment can be reduced to achieve good reception characteristics. This is achieved by capability of maintaining the sampling timing of the A/D converter optimal by the phase shift control portion and the phase shifter.

Although the present invention has been illustrated and described with respect to exemplary embodiments thereof, it should be understood by those skilled in the art that the foregoing and various changes, emission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A demodulation circuit for demodulating a digital transmission signal having improved power consumption levels and sampling frequency for an analog-to digital (A/D) converting means wherein a known signal is inserted in said digital transmission signal at transmission, said demodulation circuit comprising:

said A/D converting means for performing A/D conversion of a base band signal obtained by demodulation of said digital transmission signal; and phase shifting means for repeatedly varying a phase shift of one of said digital transmission signal and said base band signal before digital conversion by said A/D converting means on the basis of a comparison between said known signal after digital conversion by said A/D converting means and prior to a parallel-to-serial (P/S) conversion with said known signal that was inserted at transmission, wherein said phase shifting means modifies shifting amounts of a plurality of phase shifting elements for N times (in which N is an integer greater than or equal to one) where the phase shift equals $\Delta\theta_n$ (in which n is in the range of 1 to N) and a comparison means compares said known signal after digital conversion by said A/D converting means and said known signal inserted at transmission for each of said N times and a result from said comparison means is stored in a memory means for each of said N times and a second comparison means for comparing each of the N results from said comparison means.

2. A demodulation circuit as set forth in claim 1, wherein said phase shifting means causes phase shift to a phase where a correlation value of said known signal inserted at transmission and said known signal after digital conversion by said A/D converting means becomes the highest.

3. A demodulation circuit as set forth in claim 1, wherein said phase shifting means repeats a process for N times for M times, in which M is positive integer to take an average value of optimal phase shifting amount for M times as a final optimal phase shifting amount.

4. A demodulation method for demodulating a digital transmission signal having improved power consumption levels and sampling frequency for an analog-to-digital (A/D) converting means wherein a known signal is inserted in said digital transmission signal at transmission said demodulation method comprising:

(a) performing A/D conversion of a base band signal obtained by demodulation of said digital transmission signal;

(b) comparing said known signal after digital conversion prior to parallel-to-serial (P/S) conversion with said known signal inserted at transmission;

(c) varying a phase shift of one of said digital transmission signal and said base band signal before digital conversion by said A/D converting means on the basis of said comparing;

(d) modifying shifting amounts of a plurality of phase shifting elements for N times (in which N is an integer greater than or equal to one where the phase shift equals $\Delta\theta_n$ (in which n is an integer from 1 to N);

(e) comparing said known signal after digital conversion by said A/D converting means and said known signal inserted at transmission for each of said N times;

(f) storing a result of the comparing in a memory means for each of said N times; and (g) comparing each of the N results from the comparing in step (e) and storing in step (f).

5. A demodulation method as set forth in claim 4, wherein step (g) further comprising varying the phase shift to a phase where a correlation value of said known signal inserted at transmission and said known signal after digital conversion becomes the highest.

6. A demodulation method as set forth in claim 4, wherein said steps (e) through (g) are repeated for M times, in which M is positive integer to take an average value of optimal phase shifting amount for M times as a final optimal phase shifting amount.

* * * * *